US009199794B2

(12) United States Patent
Nadachi et al.

(10) Patent No.: US 9,199,794 B2
(45) Date of Patent: Dec. 1, 2015

(54) CONVEYOR, PRINTING DEVICE, AND BOX MAKING MACHINE

(71) Applicant: MITSUBISHI HEAVY INDUSTRIES PRINTING & PACKAGING MACHINERY, LTD., Mihara-shi, Hiroshima (JP)

(72) Inventors: Mitsuhiro Nadachi, Mihara (JP); Osamu Hatano, Mihara (JP)

(73) Assignee: MITSUBISHI HEAVY INDUSTRIES PRINTING & PACKAGING MACHINERY, LTD., Hiroshima (JP)

( * ) Notice: Subject to any disclaimer, the term of this patent is extended or adjusted under 35 U.S.C. 154(b) by 0 days.

(21) Appl. No.: 14/375,327

(22) PCT Filed: Feb. 5, 2013

(86) PCT No.: PCT/JP2013/052546
§ 371 (c)(1),
(2) Date: Jul. 29, 2014

(87) PCT Pub. No.: WO2013/118696
PCT Pub. Date: Aug. 15, 2013

(65) Prior Publication Data
US 2014/0378285 A1    Dec. 25, 2014

(30) Foreign Application Priority Data

Feb. 10, 2012  (JP) .................................. 2012-027089

(51) Int. Cl.
*B65H 39/02*  (2006.01)
*B65G 15/58*  (2006.01)
(Continued)

(52) U.S. Cl.
CPC . *B65G 15/58* (2013.01); *B31B 1/88* (2013.01); *B41F 3/00* (2013.01); *B65H 5/224* (2013.01); *B65H 2406/35* (2013.01); *B65H 2701/176* (2013.01)

(58) Field of Classification Search
CPC ...................................................... B65H 5/224
USPC ............................................................ 101/419
See application file for complete search history.

(56) References Cited

U.S. PATENT DOCUMENTS 3,776,004 A * 12/1973 Fleissner .................. D06B 3/10
                                                             68/5 E
5,094,658 A *  3/1992 Smithe ..................... B65H 45/12
                                                             493/248

(Continued)

FOREIGN PATENT DOCUMENTS

JP      8-295009 A    11/1996
JP     11-170197 A     6/1999

(Continued)

OTHER PUBLICATIONS

International preliminary report on patentability mailed Aug. 21, 2014, corresponds to PCT/JP2013/052546.

(Continued)

*Primary Examiner* — Anthony Nguyen
(74) *Attorney, Agent, or Firm* — Kanesaka Berner & Partners LLP (57) ABSTRACT

A conveyor that is disposed at a printing unit of a box making machine and conveys a corrugated sheet 10*a* that is to undergo printing, includes: a conveyor belt 23 having a conveying face that conveys the corrugated sheet; a suction box 24*a* that is disposed at a side of a back 23*b* of the conveying face of the conveyor belt and that suctions the corrugated sheet onto the conveying face with negative pressure; a plurality of guide rolls that guide or drive the conveyor belt. Air blowing means is disposed on the back side of the conveyor belt within a region from an outlet roll to an inlet roll of the guide rolls and blows air to an outside.

15 Claims, 7 Drawing Sheets

(51) Int. Cl.
*B65H 5/22* (2006.01)
*B31B 1/88* (2006.01)
*B41F 3/00* (2006.01)

(56) References Cited

U.S. PATENT DOCUMENTS

| | | | | |
|---|---|---|---|---|
| 5,562,032 | A | * | 10/1996 | Hasegawa et al. ............ 101/232 |
| 5,782,183 | A | * | 7/1998 | Andrews, Jr. ................. 101/232 |
| 2005/0122372 | A1 | * | 6/2005 | Shimizu ........................... 347/22 |
| 2007/0071484 | A1 | * | 3/2007 | Igarashi ........................... 399/92 |
| 2008/0002011 | A1 | * | 1/2008 | Mizutani .................. B31B 1/88 347/104 |
| 2008/0225068 | A1 | * | 9/2008 | Morino ..................... B41J 2/2135 347/14 |

FOREIGN PATENT DOCUMENTS

| | | |
|---|---|---|
| JP | 2005-088119 A | 4/2005 |
| JP | 2006-1686 A | 1/2006 |
| JP | 2009-274399 A | 11/2009 |

OTHER PUBLICATIONS

International Search Report mailed May 14, 2013 in International Application No. PCT/JP2013/052546, filed Feb. 5, 2013.

* cited by examiner

CONVEYOR, PRINTING DEVICE, AND BOX MAKING MACHINE

RELATED APPLICATIONS

The present application is a National Phase of International Application Number PCT/JP2013/052546, filed Feb. 5, 2013, which claims priority to Japanese Application No. JP 2012-027089, filed Feb. 10, 2012.

FIELD

The present invention relates to a conveyor included in a printing unit of a box making machine, a printing device including the conveyor, and a box making machine including the printing device.

BACKGROUND

An example of a machine that manufactures paper products is a box making machine that manufactures a corrugated box from a corrugated sheet cut into a predetermined length in advance. An example of a box making machine includes, in sequence from the upstream side, a feeding unit, a printing unit, a slotter creaser unit, a die cutting unit, a folder gluer unit, and a counter ejector. The printing unit prints a letter and/or a picture on a corrugated sheet fed from the feeding unit, while conveying the corrugated sheet; the slotter creaser unit slots and creases the corrugated sheet to form the corrugated sheet into a box shape; the die cutting unit punches out holes, such as hand holes and air vent holes, in the corrugated sheet and slots and creases the corrugated sheet if desired; the folder gluer unit applies glue on one end of the corrugated sheet and folds the corrugated sheet to glue the both ends; and the counter ejector unit finally piles a predetermined number of corrugated sheets.

If the manufacture of such a paper product includes a step of cutting paper material, paper dust is generated by cutting the paper material. Further, if a paper material (corrugated sheet) cut in advance is processed likewise in the above box making machine, the paper material usually includes paper dust generated by cutting the paper material. Since such paper dust brings harm such as failure in printing, uncleanliness of factories, and failure in sheet conveyance due to stacked paper dust, techniques for removing paper dust has been developed.

For example, Patent Literature 1 discloses a technique to remove paper dust generated when a blank sheet for a multi-pack packaging box is manufactured by punching the material web into a predetermined shape and concurrently creasing for folding while the web is being conveyed. In this technique, a sheet conveying device transfers the punched sheet into a housing from an inlet to an outlet. During this transfer, air jetting nozzles disposed at both ends of the width direction of the punched sheet being transferred jet high-pressure air to the width direction of the punched sheet and thereby removes paper dust adhering to the sheet. A suction duct connected to the upper portion of the housing suctions air in the housing. With this configuration, little paper dust leaks out of the housing, so that the working environment can be escaped from worsening and the surrounding of the housing can be escaped from becoming dirty.

Patent Literature 2 discloses a configuration in which: a first suction conveyor that transfers products under suction is disposed downstream of a sheet-conveyor that transfers the products fed from a sheet punching device in one direction; a second suction conveyor transferring products under suction is disposed so as to bridge between the sheet-conveyor and the first suction conveyor; and a first suction duct is disposed below the second suction conveyor. With this configuration, a technique is disclosed to remove punched sheet dust remaining on the products by suctioning the products with the first suction duct while the second suction conveyor transfers the products under suction.

PRIOR ART REFERENCE

Patent Literature

[Patent Literature 1] Japanese Laid-Open Patent Publication No. 2005-88119
[Patent Literature 2] Japanese Laid-Open Patent Publication No. HEI 11-170197

SUMMARY OF INVENTION

Problem to be Solved by Invention

The above box making machine has the printing unit that prints a letter and/or a picture on the surface of a corrugated sheet while the conveyor transfers the sheet. The conveyor includes an endless belt having multiple holes, is circulated under the guidance by various guide rolls such as an inlet roll, receiving roll, a belt angle adjusting roll, and a belt tension adjusting roll, and thereby transfers the corrugated sheet. A suction box is disposed below a part of the conveyor belt which part carries thereon the corrugated sheet. The corrugated sheet is transferred while being suctioned onto the upper face of the conveyor belt with the negative pressure in the suction box, and thereby can undergo printing on a predetermined position without being misaligned.

Figure 9:
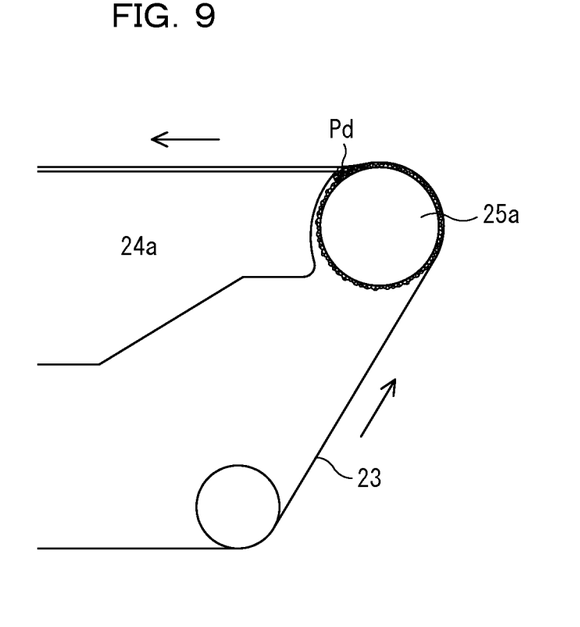
FIG. 9 is a side view of the main part of a conveyor and a printing device including the conveyor to explain a problem to be solved by the present invention.

The corrugated sheet that is cut in advance and is fed to the printing unit has paper dust generated when being cut. The paper dust is suctioned to the inner side of the conveyor belt when the suction box suctions the corrugated sheet, and some of the paper dust suctioned to the inner side of the conveyor belt adheres to the inner face of the conveyor belt. Furthermore, paper dust generated when downstream units (i.e., the slotter creaser unit and the die cutting unit) cut the sheet enters through the holes of the conveyor belt and adheres to the inner face of the conveyor belt. The paper dust adhering to the inner face of the conveyor belt moves in conjunction with the circulation of the conveyor belt and, as depicted in FIG. 9 for example, is then accumulated between an inlet roll 25a and an upper-most suction box 24a. The accumulated paper dust Pd comes to be settled on the outer circumference of the inlet roller 25a and the inner face of the conveyor belt 23 due to moisture in the course of time. If this state persists for a long time, the running face of the conveyor belt 23 that supports corrugated sheet may swell to hinder the corrugated sheet from being properly transferred. In addition, it has been proved that improper transferring of a corrugated sheet harmfully affects printing.

With the foregoing problems in view, the object of the present invention is to provide a conveyor, a printing device including the conveyor, and a box making machine including the printing device that are configured not to accumulate paper dust between the inlet roll and the suction box in the conveyor so as not to swell the running face of the conveyor belt in the printing unit in the box making machine.

Means to Solve the Problem

To attain the above object, there is provided a conveyor that is disposed at a printing unit of a box making machine and conveys a corrugated sheet that is to undergo printing, including: a conveyor belt having a conveying face that conveys the corrugated sheet; a suction box that is disposed at a back side of the conveying face of the conveyor belt and that suctions the corrugated sheet onto the conveying face with negative pressure; a plurality of guide rolls that guide or drive the conveyor belt, the plurality of guide rolls including an inlet roll disposed at a side of an inlet where the corrugated sheet is fed onto the conveyor belt and an outlet roll disposed at a side of an outlet where the corrugated sheet is ejected from the conveyor belt; and air blowing means that is disposed on the back side of the conveyor belt within a region where the conveyor belt proceeds from the outlet roll to the inlet roll and that blows air to an outside.

As a preferable feature, the conveyor may further include a partition member that is disposed at the back side of the conveyor belt within the region where the conveyor belt proceeds from the outlet roll to the inlet roll, that extends along a cross direction of the conveyor, and that forms a compartment in combination with the back of the conveyor belt, and the air blowing means may blow the air inside the compartment and exhaust the air out of the compartment As another preferably feature, the plurality of guide rolls may include the inlet roll, the outlet roll, a lower outlet roll disposed below the outlet roll, and a lower inlet roll disposed below the inlet roll; the conveyor belt may convey the corrugated sheet while moving from the side of the inlet to the side of the outlet under a guidance by the inlet roll and the outlet roll and, after conveying the corrugated sheet, may return from the side of the outlet to the side of the inlet under a guidance by the lower outlet roll and the lower inlet roll; and the compartment may be arranged in a circulation path of the conveyor belt within a region from the outlet roll, passing the lower outlet roll and the lower inlet roll, to the inlet roll.

As an additional preferable feature, the compartment may be arranged within a region from the lower inlet roll to the inlet roll in the circulation path.

As a further preferable feature, the compartment may be disposed immediately upstream of the inlet roll; and the compartment may be defined by the partition member, the back of the conveyor belt, and an outer circumference of the inlet roll or by the partition member, the back of the conveyor belt, the outer circumference of the inlet roll, and a wall face of the suction box.

As a still further preferable feature, the conveyor may further include air charging means that charges the air blown in the compartment by the air blowing means with the same polarity as that of the conveyor belt to a stronger charged state than that of the conveyor belt.

As a still further preferable feature, the air blowing means may use negative pressure of the suction box.

As a still further preferable feature, the air blowing means may include: an air supplying unit that supplies air inside the compartment; and an air exhausting unit that exhausts the air supplied inside the compartment to an outside, the air supplying unit may be disposed at one end of the compartment extending along the cross direction of the conveyor, and the air exhausting unit may be disposed at the other end of the compartment.

As a still further preferable feature, the air blowing means may include: an air supplying unit that supplies air inside the compartment; and an air exhausting unit that exhausts the air supplied inside the compartment to an outside, and one of the air supplying unit and the air exhausting unit may be disposed at the partition member while the other one of the air supplying unit and the air exhausting unit may be disposed at both ends of the compartment extending along the cross direction of the conveyor.

As a still further preferable feature, the air exhausting unit may be connected to an exhausting duct included in the box making machine.

As a still further preferable feature, at least one of the air supplying unit and the air exhausting unit is provided with an air gun.

As a still further preferable feature, the partition member may be formed of a curved plate having a curved unit and may be fixed to supporting frames that are installed at the left and right of the conveyor belt and that support the plurality of guide rolls.

As a still further preferable feature, the conveyor may further include a device that vacuums paper dust adhering to the corrugated sheet being conveyed, the device being adjacent to an upstream side or a downstream side of an opposing roll along a conveying direction of the corrugated sheet, the opposing roll being opposed to the inlet roll.

There is provided a printing device having a conveyor and serving as a printing unit of a box making machine, the printing device including: the conveyor detailed above; and a plurality of printing cylinders that print a letter and/or a picture on the corrugated sheet being conveyed on the conveying face of the conveyor belt.

There is provided a box making machine including, in sequence from an upstream side, a feeding unit; a printing unit that prints a letter and/or a picture on a corrugated sheet fed from the feeding unit while conveying the corrugated sheet; a slotter creaser unit that slots and creases the corrugated sheet subjected to printing in the printing unit; and a die cutting unit that punches a hole in the corrugated sheet subjected to the printing and ejected from the slotter creaser unit, wherein the printing unit is provided with a printing device detailed above.

There is provided another box making machine including, in sequence from an upstream side, a feeding unit; a printing unit that prints a letter and/or a picture on a corrugated sheet fed from the feeding unit while conveying the corrugated sheet; and a die cutting unit that punches a hole in, slots, and creases the corrugated sheet subjected to printing in the printing unit, wherein the printing unit is provided with a printing device detailed above.

The die cutting unit may slot and crease the corrugated sheet to form a box having a special shape in addition to punching a hole, such as a hand hole or an air vent hole.

Effects of Invention

The conveyor of the present invention includes the air blowing means that is disposed on the back side of the conveyor belt within the region where the conveyor belt proceeds from the outlet roll to the inlet roll and that blows air to the outside. With the air blowing means, when paper dust adhering to the corrugated sheet and paper dust generated when the corrugated board is cut adhere to the back of the conveyor belt, for example, under the suction by the suction box, the paper dust adhering to the back is removed from the back and is exhausted to the outside by air blown. Accordingly, paper dust is not accumulated between the inlet roll and the suction box in the conveyor, so that the running face of the conveyor belt is prevented from swelling.

The conveyor further includes a partition member that is disposed at the back side of the conveyor belt within the region where the conveyor belt proceeds from the outlet roll to the inlet roll, that extends along a cross direction of the conveyor, and that forms a compartment in combination with the back of the conveyor belt, so that the air blowing means blows the air inside the compartment and exhausts the air from the compartment. With this configuration, paper dust adhering to the back of the conveyor belt can be efficiently exhausted from the compartment.

Since a space for the compartment can be relatively easily reserved in the circulation path of the conveyor belt within the region where the conveyor belt proceeds from the outlet roll, passing the lower outlet roll and the lower inlet roll, to the inlet roll and where the suction box is not disposed, arranging the compartment in this region provides advantages in layout.

Arranging the compartment in a region from the lower inlet roll to the inlet roll in the circulation path makes it possible to remove paper dust on the back of the conveyor belt immediately before entering the space between the inlet roll and the suction box where paper dust tends to easily stack. Consequently, it is possible to efficiently prevent paper dust from entering the space between the inlet roll and the suction box.

In particular, when the compartment is arranged at a position immediately upstream of the inlet roll and is defined by the partition member, the back of the conveyor belt, and the outer circumference of the inlet roll or by the partition member, the back of the conveyor belt, the outer circumference of the inlet roll, and a wall face of the suction box, intrusion of paper dust into the space between the inlet roll and the suction box can be efficiently avoided and the compartment can be formed at a low cost because of using faces of other requisite parts and elements of the conveyor.

Since air flowing inside the compartment is charged with the same polarity as that of the conveyor belt to a stronger charged stated than that of the conveyor belt, paper dust adhering to the back of the conveyor belt due to the presence of electrical adhesion generated by the opposite polarity of the conveyor belt is attached to the blowing air that is charged stronger and is thereby removed from the back of the conveyor belt.

Using negative pressure of the suction box for an air blowing means can reduce a facility cost.

With an air supplying unit that supplies air inside the compartment; and an air exhausting unit that exhausts the air supplied inside the compartment to the outside, wherein the air supplying unit is disposed at one end of the compartment extending in the cross direction of the conveyor and the air exhausting unit is disposed at the other end of the compartment or wherein one of the air supplying unit and the air exhausting unit is disposed at the partition member and the other one of the air supplying unit and the air exhausting unit is disposed at the both ends of the compartment, smooth air flow can be generated inside the compartment.

Connecting the air exhausting unit to the exhausting duct included in the box making machine can suppress the facility cost.

Using an air gun for at least one of the air supplying unit and the air exhausting unit can generate a strong air flow in the compartment with a relatively small power.

Fixing the partition member, which is formed of a curved plate having a curved unit, to supporting frames that are installed at the left and right of the conveyor belt can shape the compartment, which is defined by the partition member, as well as the partition member at a low cost.

When the device that vacuums paper dust adhering to the corrugated sheet being conveyed is installed adjacently to the upstream side or the downstream side of an opposing roll that is opposed to the inlet roll along a conveying direction of the corrugated sheet, the amount of paper dust to be suctioned by the suction box and consequently to stick on the back of the conveyor belt can be reduced.

The printing device having the conveyor belt and the box making machine including the same printing device of the present invention make it possible to correctly carry out printing on corrugated sheets, so that high-quality blank corrugated sheets can be manufactured.

BRIEF DESCRIPTION OF DRAWINGS

FIGS. 6(*a*) and 6(*b*) are figures of drawings illustrating the main part of a conveyor according to a first modification of the embodiment, FIG. 6(*a*) being a perspective view and FIG. 6(*b*) being a side view;

FIGS. 7(*a*) and 7(*b*) are figures of drawings illustrating the main part of a conveyor according to a second modification of the embodiment, FIG. 7(*a*) being a perspective view and FIG. 7(*b*) being a side view;

EMBODIMENT TO CARRY OUT INVENTION

Hereinafter, an embodiment of the present invention will now be described by referring to the accompanying drawings.

FIGS. 1-5 relates to the embodiment of the present invention. A conveyor, a printing device including the conveyor, and a box making machine including the printing device will now be described by referring to these drawings.

Box Making Machine:

First of all, a box making machine according to the embodiment will now be described by referring to FIG. 2.

Figure 2:
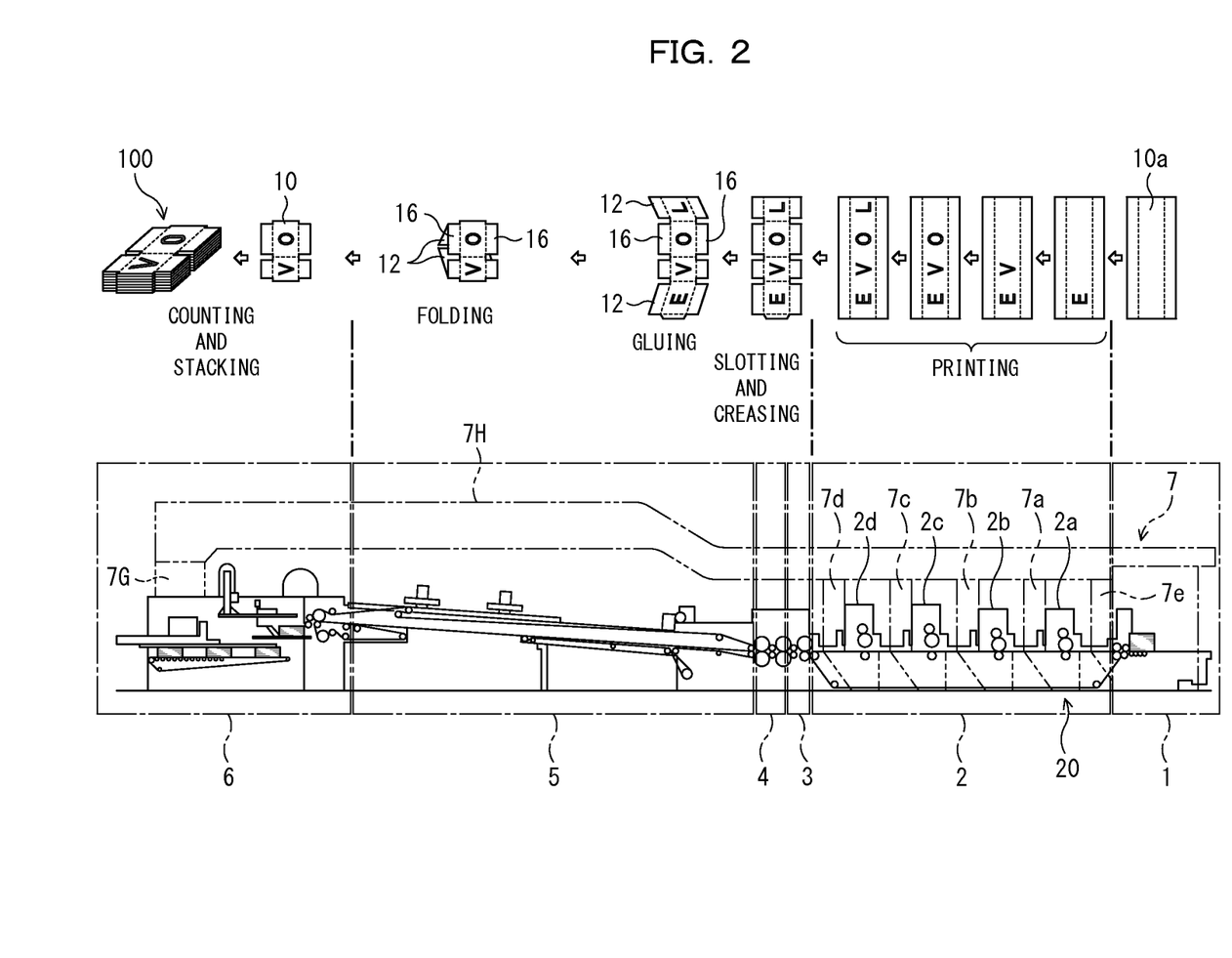
FIG. 2 is a side view of a box making machine of the embodiment of the present invention.

FIG. 2 illustrates a process of forming a corrugated sheet into a sheet ready to be formed into a box on the upper portion separately from the machine configuration illustrated at the lower portion. As illustrated in FIG. 2, the box making machine includes, sequentially from the upstream side, a feeding unit 1, a printing unit 2, a slotter creaser unit 3, a die cutting unit 4, a folder gluer unit 5, and a counter ejector unit 6.

Multiple corrugated sheets 10*a* are piled in the feeding unit 1, which feeds the corrugated sheets 10*a* to the printing unit 2 one by one.

The printing unit 2 is formed of a predetermined number (here, four for respective colors) of printing units 2*a*-2*d*. The printing unit 2 sequentially prints a letter and/or a picture on a corrugated sheet 10*a* being conveyed by a conveyor 20 one by one with respective color inks.

In the slotter creaser unit 3 and the die cutting unit 4, each corrugated sheet 10*a* having been undergone printing in the printing unit 2 is slotted and creased.

Namely, the slotter creaser unit 3 slots and creases the corrugated sheet 10*a* and the die cutting unit 4 punches out holes, such as hand holes and air vent holes, in the corrugated sheet 10*a*.

The die cutting unit 4 may slot and crease the corrugated sheet 10*a* that is to be formed into a special box shape. For this purpose, both slotter creaser unit 3 and the die cutting unit 4 have the function of slotting and creasing.

The folder gluer unit 5 applies glue to a margin formed on the left or right end of the corrugated sheet 10*a* having undergone slotting and creasing, and folds the corrugated sheet 10*a* such that the left and right ends of the corrugated sheet 10*a* overlap at the bottom side of the folded sheet. Keeping this posture, the left and right ends of the corrugated sheet 10*a* are bonded to each other with glue, so that corrugated sheet 10*a* is formed into a sheet 10 ready to be formed into a box (a blank for corrugated box).

The counter ejector unit 6 counts sheets 10 that is processed in the folder gluer unit 5 and is ready to be formed into boxes, and piles the sheets 10 on the stacker. Upon piling a predetermined number of sheets 10 ready to be formed into boxes, the counter ejector unit 6 ships the sheet pack 100 as a single unit.

A suction duct 7H serving as a dust collecting system 7 is disposed in the upper portion of the box making machine. Connector ducts 7*a*-7*d* connected to the suction duct 7H are provided to the respective printing units 2*a*-2*d*. Paper dust in the box making machine is suctioned at the entrances of the connector ducts 7*a*-7*d* and finally collected in the dust collector 7G through the suction duct 7H.

The box making machine may alternatively be a wrap-around caser, which omits the slotter creaser unit 3 but has the die cutting unit 4 that in turn slots and creases the corrugated sheet 10*a* for forming a special shape box in addition to punching holes, such as hand holes and air vent holes, and which brings the slotted and creased corrugated sheet 10*a* onto the production line; puts articles onto the corrugated sheet 10*a*; and packages the articles by forming a box so as to wrap the articles. The sheet ready to be formed into a box that is to be provided to such a machine is a corrugated sheet 10*a* that has undergone processing in the die cutting unit 4 that performs printing, slotting, and creasing. In this case, the box making machine omits the folder gluer unit 5 and conveys the corrugated sheet 10*a* after processed in the die cutting unit 4 to the counter ejector unit 6, which processes and ships the corrugated sheet 10*a*. The present invention can be also applied to such a box making machine.

Conveyor and Printing Device:

Next, the conveyor 20 applied to the printing unit 2 of the box making machine and the printing device including the conveyor 20 will now be described.

Figure 3:
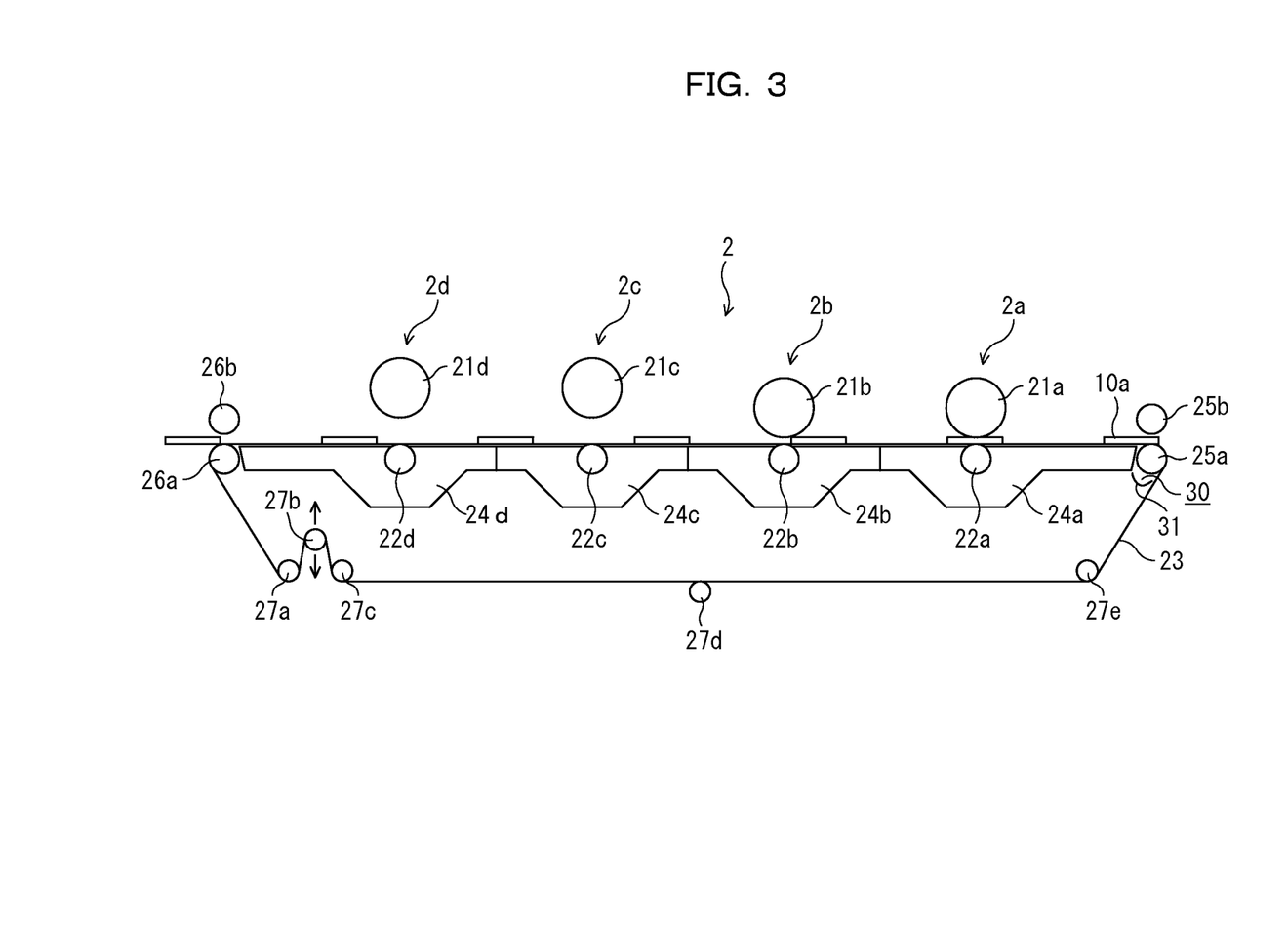
FIG. 3 is a side view of the conveyor and the printing device including the conveyor according to the embodiment.

As illustrated in FIG. 3, the printing unit 2 includes the conveyor 20 having a conveyor belt 23, and the printing units 2*a*-2*d* that sequentially print a letter and/or a picture on the corrugated sheet 10*a* being conveyed by the conveyor 20 one by one with the respective color inks.

The printing units 2*a*-2*d* include printing cylinders 21*a*-21*d* that transfer inks to the face to be printed of the corrugated sheet 10*a* and that are disposed over the conveyor belt 23, and impression cylinders 22*a*-22*d* that generate nip pressure by interposing the corrugated sheet 10*a* in combination with the respective printing cylinders 21*a*-21*d* and that for this purpose are disposed under the conveyor belt 23. Not appearing in FIG. 3, anilox rollers (see FIG. 2) being in contact with the respective printing cylinders 21*a*-21*d* transfer inks to the respective corresponding printing cylinders 21*a*-21*d*. The transferred inks are further transferred from the printing cylinders 21*a*-21*d* to the corrugated sheet 10*a* running on the conveyor belt 23 through a space between the printing cylinders 21*a*-21*d* and the impression cylinders 22*a*-22*d*, so that the printing process is completed.

Some of printing cylinders 21*a*-21*d* corresponding to unused ink colors are evacuated so as to be apart from the corrugated sheet 10*a*. FIGS. 2 and 3 illustrate an example that the printing cylinders 21*c* and 21*d* of the printing unit 2*c* and 2*d* are evacuated.

The conveyor 20 includes the conveyor belt 23, guide rolls 25*a*, 25*b*, 26*a*, 26*b*, and 27*a*-27*e* that guide or guide and drive the conveyor belt 23, and suction boxes 24*a*-24*d* that are arranged across the conveyor belt 23 from the conveying route of the corrugated sheet 10*a*.

The conveyor belt 23 is formed by laminating a cloth sheet on a rubber sheet and is flexible but non-stretchable. In addition, the conveyor belt 23 is endless and has many small holes providing access between the top and the bottom surfaces for suctioned air. The conveyor belt 23 circulates on a line guided by the guide rolls 25*a*-27*b* and thereby conveys the corrugated sheet 10*a*.

The conveyor 20 includes an inlet roll 25*a* as one of the guide rolls at the inlet that is next to the feeding unit 1 and where the corrugated sheet 10*a* enters the printing unit 2, and an outlet roll 26*a* as one of the guide rolls at the outlet that is next to the slotter creaser unit 3 and where the corrugated sheet 10*a* is ejected from the printing unit 2. A lower outlet roll 27*a* is disposed at a position below the outlet roll 26*a* and shifted upstream from the outlet roll 26*a* in the conveying route of the corrugated sheet 10*a* (i.e., in the direction distant from the slotter creaser unit 3) while a lower inlet roll 27*e* is disposed at a position below the inlet roll 25*a* and shifted downstream from the inlet roll 25*a* in the conveying route of the corrugated sheet 10*a* (i.e., in the direction distant from the feeding unit 1).

The lower outlet roll 27*a* can adjust the axial center direction thereof and functions as a belt angle adjusting roll that adjusts a possible meandering state of the conveyor belt 23 through adjustment of the angle in the axial center direction. For example, the position of the operating-end of the lower inlet roll 27*e* is fixed while the position of the driving-end of the lower inlet roll 27*e* is movable downstream and upstream along the conveying route as depicted in the two-dotted line of FIG. 1 so that the position of the driving-end is shifted to change the angle of the axial center of the lower inlet roll 27*e*. Consequently, such change of the angle of the axial center of the lower inlet roll 27*e* can adjust possible meandering of the conveyor belt 23.

Here, the lower outlet roll 27*a* is rotatably driven by a non-illustrated driving device and functions as a driving roll that circulates the conveyor belt 23.

Further, the guide roll 27*b* disposed between the lower outlet roll 27*a* and a lower roll 27*c* adjacent to the lower outlet roll 27*a* is movable in the direction approaching and departing from the lower rolls 27*a* and 27*c* as arrows in FIG. 3 indicate. A change in the position of the axial center of the guide roll 27*b* in tensioner release direction due to such a movement can adjust the tension of the entire belt. Consequently, the guide roll 27*b* functions as a belt tension adjusting roll.

Suction boxes 24*a*-24*d* are provided to the printing units 2*a*-2*d*, respectively, and are arranged in succession. Each of the suction boxes 24*a*-24*d* is connected to a non-illustrated suction blower, which removes air in the corresponding suction box to keep the inside of the suction box under a negative pressure.

The corrugated sheet 10a on the conveying face being a top face (surface) 23a of the conveyor belt 23 while running from the inlet roll 25a to the outlet roll 26a sticks on the conveying face 23a due to the negative pressure in the suction boxes 24a-24d, so that the corrugated sheet 10a can be conveyed without misalignment in the conveying direction.

Although the inlet part and the outlet part where the inlet roll 25a and the outlet roll 26a are disposed, respectively, are not covered by a suction box, opposing rolls 25b and 26b are arranged opposite to the inlet roll 25a and the outlet roll 26a, respectively. With this structure, the corrugated sheet 10a is nipped between the rolls 25a and 25b or between the 26a and 26b while being conveyed, so that the corrugated sheet 10a can be conveyed without misalignment in the conveying direction also in these areas.

Figure 1:
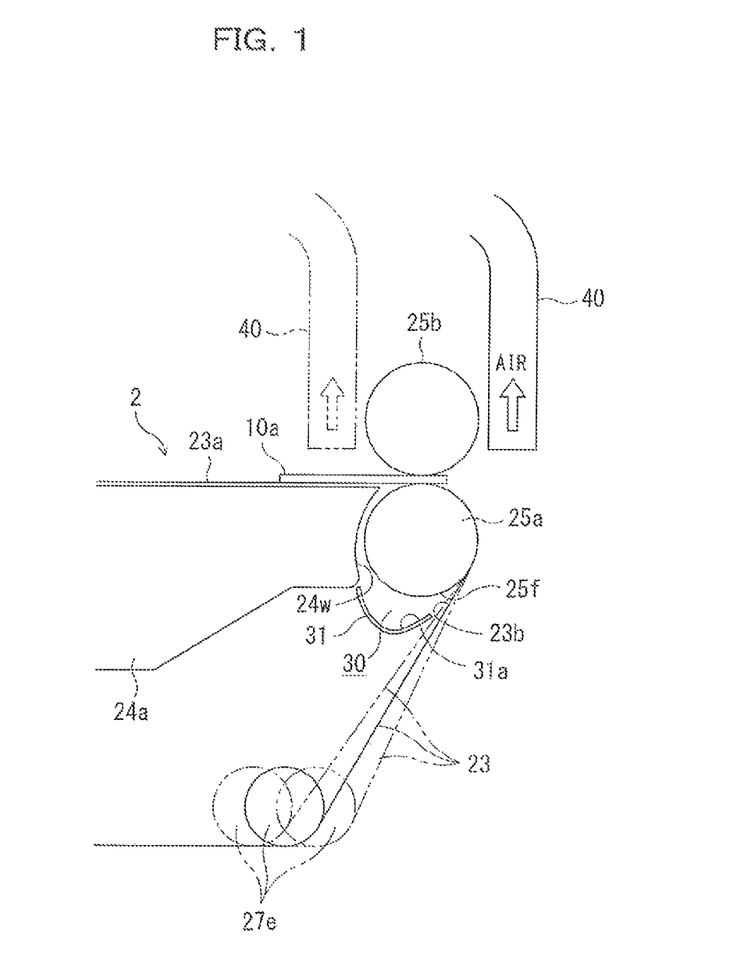
FIG. 1 is a side view of the main part of a conveyor and a printing device including the conveyor according to an embodiment of the present invention.
Figure 4:
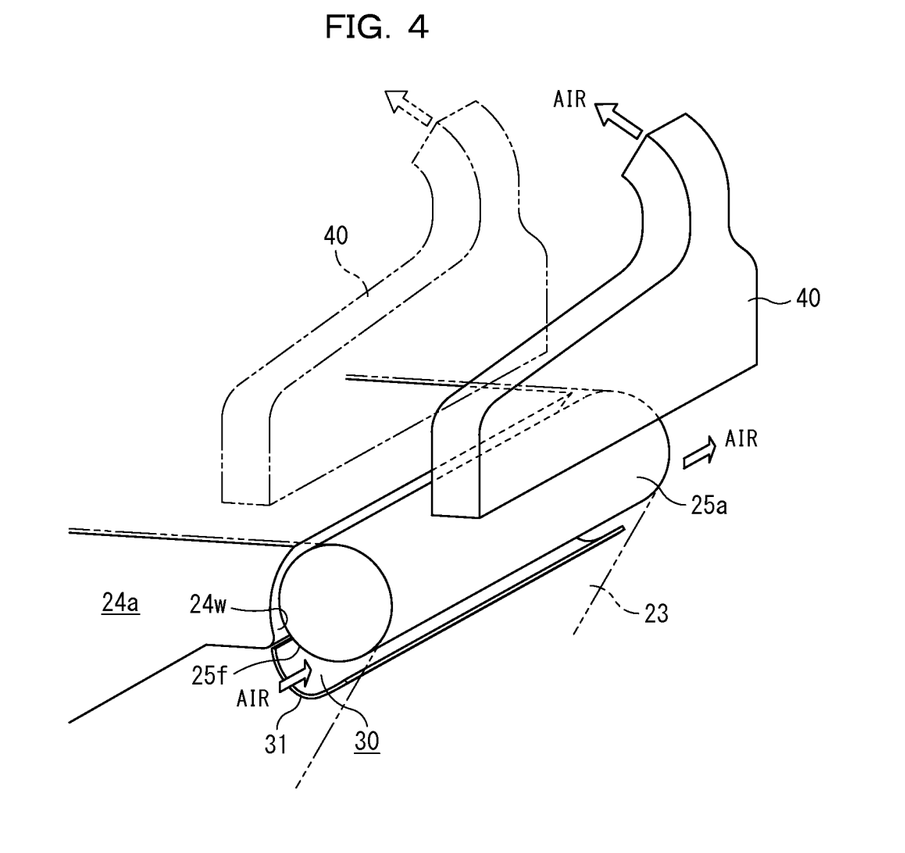
FIG. 4 is a perspective view of the main part of the conveyor and the printing device including the conveyor according to the embodiment.
Figure 5:
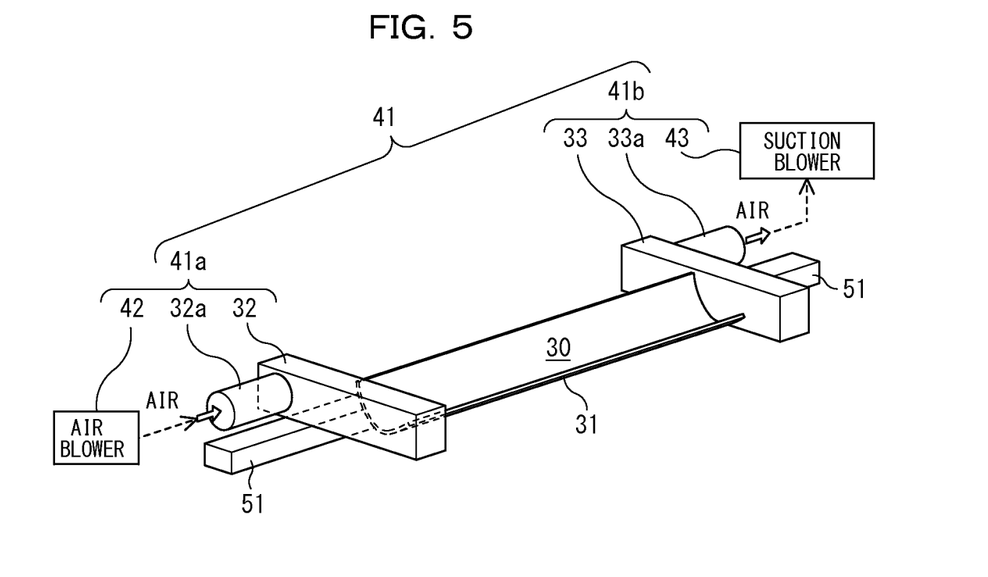
FIG. 5 is a perspective view of the main part of the conveyor according to the embodiment.

As shown in FIGS. 1, 4, and 5, a duct cover 31 serving as a partition member is arranged at a position at which the conveyor belt 23 proceeds to and comes in contact with inlet roll 25a from the lower inlet roll 27e, that is, the point directly under the inlet roll 25a (with respect to the traveling direction of the conveyor belt 23, immediately upstream of the inlet roll 25a). The inside of the duct cover 31 defines the duct (compartment) 30 for removing paper dust on belt which duct 30 is segmented from the environment.

The duct cover 31 extends along the cross direction of the conveyor and is formed of a curved plate having a curved unit. The duct cover 31 is fixed, via a supporting beam 51, to non-illustrated supporting frames that are arranged on the left and the right of the conveyor belt 23 and that supports the guide rolls 25a-27e.

The duct 30 is surrounded and defined by an inner face 31a of the duct cover 31, a back 23b of the conveyor belt 23 passing directly under the inlet roll 25a, an outer circumference 25f of the inlet roll 25a, and a wall face 24w of the most upstream suction box 24a.

Alternatively, the duct 30 may be surrounded and defined only by the inner face 31a of the duct cover 31 and the back 23b of the conveyor belt 23 or the duct 30 may be surrounded and defined only by the inner face 31a of the duct cover 31, the back 23b of the conveyor belt 23, and the outer circumference 25f of the inlet roll 25a.

In the embodiment, using the surfaces of multiple parts near the inlet roll 25a keeps the size of the cross unit of the duct cover 31 small and also ensures the requisite cross unit of the duct 30.

An air blow unit 41, serving as air blowing means, is connected to the duct 30. The air blow unit 41 circulates air inside the duct 30 and then exhausts the air to the outside. The air blow unit 41 includes an air supplying unit 41a that supplies air into the duct 30 and an air exhausting unit 41b that exhausts air to the outside.

The air supplying unit 41a includes the air blower 42 and an air supply duct 32 that is connected to one end of the duct cover 31 so as to block up the end of the duct cover 31 and that has a duct entrance 32a connected to the outlet port of the air blower 42. The air exhausting unit 41b includes a suction blower 43 and an air exhaust duct 33 that is connected to the other end of the duct cover 31 so as to block up the end of the duct cover 31 and has a duct exit 33a connected to the inlet port of the suction blower 43.

The suction blower 43 may also function as the suction blower connected to the suction boxes 24a-24d.

As illustrated in FIGS. 1 and 4, the air inlet of the paper dust suction duct 40 of the device for removing paper dust on sheets that removes paper dust adhering to the corrugated sheet 10a forwarded from the opposing roll 25b under suction is disposed above the inlet part of the conveyor 20, that is, at a position adjacent to the opposing roll 25b opposite to the inlet roll 25a (in the illustrated example, upstream of the opposing roll 25b along the sheet conveying direction). Alternatively, as illustrated with the two-dotted lines in FIGS. 1 and 4, the paper dust suction duct 40 may be disposed at a position downstream of the opposing roll 25b along the sheet conveying direction.

To such a paper dust suction duct 40, a non-illustrated suction blower is connected. The suction blower connected to the suction boxes 24a-24d may also be used as the suction blower connected to the paper dust suction duct 40.

The downstream parts of the air exhausting unit 41b of the air blow unit 41 and the paper dust suction duct 40 are connected to the suction duct 7H disposed in the upper portion of the box making machine through the connection duct 7e illustrated in FIG. 2. This structure collects the suctioned paper dust into dust collector 7G through the suction duct 7H.

Results and Effects:

The conveyor, the printing device including the conveyor, and the box making machine including the printing device of the embodiment of the present invention configured as the above ensure the following results and effects.

Specifically, the duct cover 31 extending in the cross direction of the conveyor is disposed on a side of the back 23b (a back side) of the conveyor belt 23 at a position at which the conveyor belt 23 proceeds to the inlet roll 25a from the lower inlet roll 27e. Such a simply structure can define the duct 30 that is surrounded and defined by the inner face 31a of the duct cover 31, the back 23b of the conveyor belt 23, the outer circumference 25f of the inlet roll 25a, and the wall face 24w of the most upstream suction box 24a. This structure makes it possible to ensure adequate area of the cross unit of the duct 30, while suppressing the size of the cross unit of the duct cover 31.

The air blow unit 41 circulates air inside the duct 30 thus formed and then exhausts the air to the outside. With this configuration, paper dust adhering to the back side of the corrugated sheet 10a and paper dust generated in the slotter creaser unit 3 or the die cutting unit 4 and suctioned by the suction boxes 24a-24d to adhere to the back 23b of the conveyor belt 23 are removed from the back 23b by the air flowing inside the duct 30; exhausted to the outside; and collected through the connection duct 7e and the suction duct 7H into the dust collector 7G.

Accordingly, no paper dust remains between the inlet roll 25a of the conveyor 20 and the suction box 24a, which avoids swell of the conveying face 23a of the conveyor belt 23. This enables the printing unit 2 to correctly accomplish printing to ensure the high quality of the sheet 10 ready to be formed into a box (i.e., a blank for corrugated board box).

In particular, the embodiment arranges the duct 30 at a position where paper dust gathers between the inlet roll 25a of the conveyor 20 and the suction box 24a and thus efficiently removes the paper dust at this position.

Using the negative pressure of the suction boxes for the air blow unit 41 makes it possible to suppress the facility cost.

Additionally, the device for removing paper dust on sheets, which device is arranged above the conveying face 23a and removes paper dust adhering to the corrugated sheet 10a being conveyed under suction, can reduce paper dust that adheres to the back 23b of the conveyor belt 23 due to the suction by the suction boxes 24a-24d.

Others:

The foregoing embodiment is detailed as above. The present invention should by no means be limited to the foregoing embodiment, and various modifications, omissions, and combinations can be suggested without departing from the gist of the present invention.

Figures 6A, 6B:
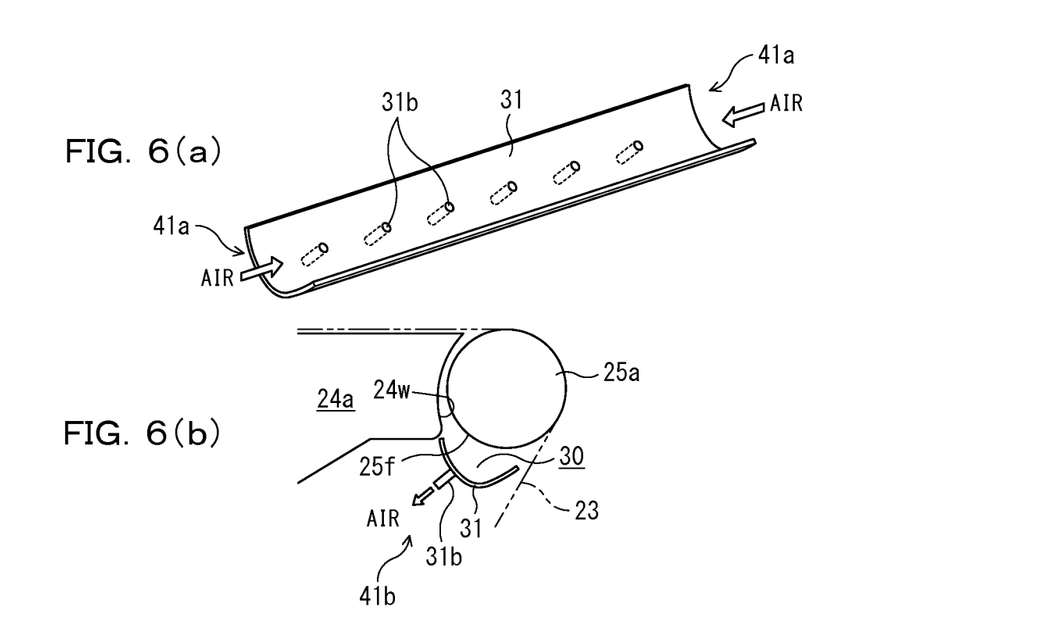

For example, the air blow unit 41 of the embodiment may be substituted with the configurations illustrated in FIGS. 6(*a*), 6(*b*) and 7(*a*) and 7(*b*).

The configuration of FIGS. 6A and 6B has air supplying units 41*a* on the both ends of the duct 30 and an air exhausting unit 41*b* formed of one or more exhausting holes 31*b* on the duct cover 31. The air taken from the both ends of the duct 30 is exhausted through the exhausting holes 31*b* formed on the duct cover 31.

Figures 7A, 7B:
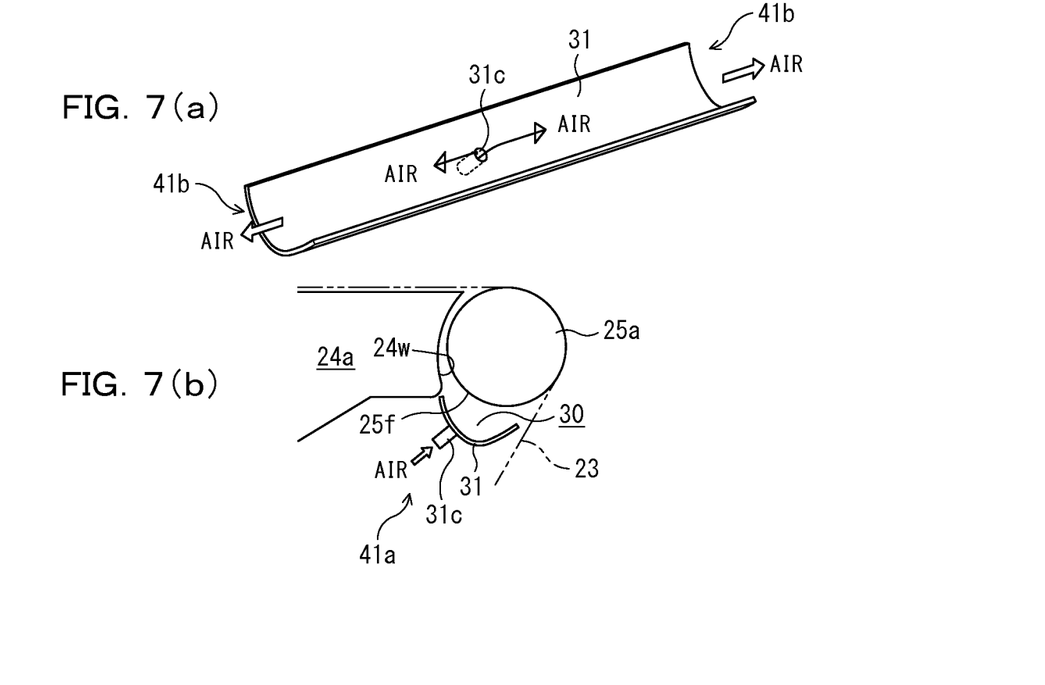

The configuration of FIGS. 7A and 7B includes an air supplying unit 41*a* formed of one or more air supplying holes 31*c* on the duct cover 31 and air exhausting unit 41*b* formed on the both ends of the duct 30. With this configuration, air taken in through the air supplying holes 31*c* formed on the duct cover 31 is exhausted through the both ends of the duct 30.

Figure 8:
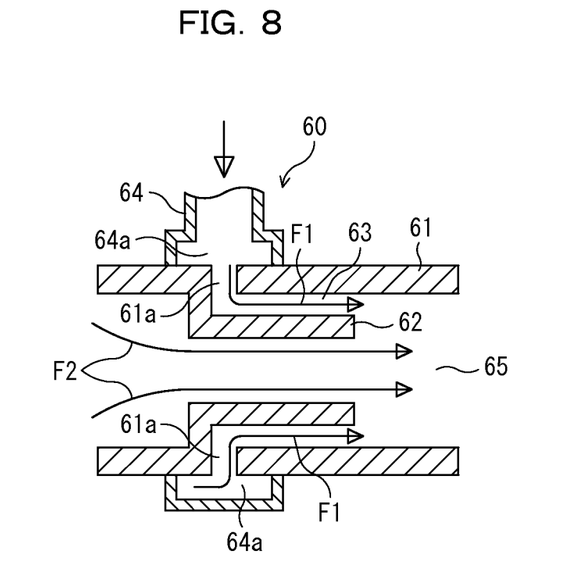
FIG. 8 is a sectional view of an air gun applicable to the conveyor of the embodiment.

As illustrated in FIG. 8, the air supplying unit 41*a* or the air exhausting unit 41*b* may be an air gun 60.

Specifically, the air gun 60 includes a cylindrical casing 61, a cyclic hole 61*a* formed around the outer circumference of the casing 61, an internal cylinder 62 disposed inside the hole 61*a*, and a one-directional cyclic flow path 63 formed between the casing 61 and the internal cylinder 62. An air inlet pipe 64 is disposed on the outer circumference of the cyclic hole 61*a*. The downstream end 64*a* of the air inlet pipe 64 takes a form of a tube, and air entering the air inlet pipe 64 and flowing through hole 61*a* into a cyclic flow path 63 generates an air flow F1, which further generates an air flow F2 from one end to the other end inside the internal cylinder 62. The air flow F2 amplitudes the air flow taken inside the air inlet pipe 64 and then blows out of the exhaust opening 65 of the casing 61. This configuration allows efficient air supply or air exhaust.

Air charging means may be disposed, which charges the air supplied by the air supplying unit 41*a* with the same polarity as that of the conveyor belt 23 to a stronger charged state than that of the conveyor belt 23.

With such air charging means, paper dust adhering to the back 23*b* of the conveyor belt 23 due to the presence of electrical adhesion generated by the opposite polarity of the conveyor belt 23 is attracted to the blowing air that is charged stronger and is thereby removed from the back 23*b* of the conveyor belt 23.

The position of the duct 30 is not limited to that of the foregoing embodiment.

This is because, with the object of removing paper dust adhering to the back 23*b* of the conveyor belt 23, the duct 30 is disposed at any point on the circulation path of the conveyor belt 23 in the region where the conveyor belt 23 proceeds from the outlet roll 26*a*, passing through the lower outlet roll 27*a* and lower inlet roll 27*e*, to the inlet roll 25*a*. In other words, the duct 30 may be arranged in any position on the back side of the conveyor belt in the region from the outlet roll to the inlet roll. Since a space for the duct 30 can be relatively ensured in this region from the outlet roll to the inlet roll at which the suction boxes 24 are not disposed and the back 23*b* of the conveyor belt 23 is exposed in this region, arranging the duct 30 in this range provides advantages in layout and further efficiency in the removal of the paper dust.

In particular, arranging the duct 30 in a region from the lower inlet roll 27*e* to the inlet roll 25*a* makes it possible to remove paper dust on the back 23*b* of the conveyor belt 23 immediately before entering the space between the inlet roll 25*a* and the suction box 24 where paper dust tends to easily stack. Consequently, it is possible to efficiently prevent paper dust from entering the space between the inlet roll 25*a* and the suction box 24.

The above embodiment uses the duct cover 31 formed of a curved plate having a curved unit as the partition member. Alternatively, a satisfactory partition member extends along the cross direction of the conveyor and forms a compartment that is separated from the environment space at the back side of the conveyor belt 23. Specifically, the duct cover 31 may be a plate having a unit in a different shape or may be a box having a unit of any shape and an opening to the back side of the conveyor belt 23.

INDUSTRIAL APPLICABILITY

The present invention is applied to a box making machine that manufactures corrugated sheets, in particular to a printing unit included in such a box making machine.

The invention claimed is:

1. A conveyor that is disposed at a printing unit of a box making machine and conveys a corrugated sheet that is to undergo printing, comprising:
   a conveyor belt having a conveying face that conveys the corrugated sheet;
   a suction box that is disposed at a back side of the conveying face of the conveyor belt and that suctions the corrugated sheet onto the conveying face with negative pressure;
   a plurality of guide rolls that guide or drive the conveyor belt, the plurality of guide rolls including an inlet roll disposed at a side of an inlet where the corrugated sheet is fed onto the conveyor belt and an outlet roll disposed at a side of an outlet where the corrugated sheet is ejected from the conveyor belt;
   air blowing means that is disposed on the back side of the conveyor belt within a region where the conveyor belt proceeds from the outlet roll to the inlet roll and that blows air to an outside; and
   a partition member that is disposed at the back side of the conveyor belt within the region where the conveyor belt proceeds from the outlet roll to the inlet roll, that extends along a cross direction of the conveyor, and that forms a compartment in combination with the back of the conveyor belt, wherein
   the air blowing means blows the air inside the compartment and exhausts the air out of the compartment.

2. The conveyor according to claim 1, wherein:
   the plurality of guide rolls include the inlet roll, the outlet roll, a lower outlet roll disposed below the outlet roll, and a lower inlet roll disposed below the inlet roll;
   the conveyor belt conveys the corrugated sheet while moving from the side of the inlet to the side of the outlet under a guidance by the inlet roll and the outlet roll and, after conveying the corrugated sheet, returns from the side of the outlet to the side of the inlet under a guidance by the lower outlet roll and the lower inlet roll; and
   the compartment is arranged in a circulation path of the conveyor belt within a region from the outlet roll, passing the lower outlet roll and the lower inlet roll, to the inlet roll.

3. The conveyor according to claim 2, wherein the compartment is arranged within a region from the lower inlet roll to the inlet roll in the circulation path.

4. The conveyor according to claim 3, wherein:
   the compartment is disposed immediately upstream of the inlet roll; and the compartment is defined by the partition member, the back of the conveyor belt, and an outer circumference of the inlet roll or by the partition member, the back of the conveyor belt, the outer circumference of the inlet roll, and a wall face of the suction box.

5. The conveyor according to claim 1, further comprising an air charging means configured to charge the air blown in the compartment by the air blowing means such that the air has a charge being a same polarity as that of the conveyor belt and the charge being stronger than that of the conveyor belt.

6. The conveyor according to claim 1, wherein the air blowing means uses negative pressure of the suction box.

7. The conveyor according to claim 1, wherein the air blowing means comprises:
   an air supplying unit that supplies air inside the compartment; and
   an air exhausting unit that exhausts the air supplied inside the compartment to an outside, wherein
   the air supplying unit is disposed at one end of the compartment extending along the cross direction of the conveyor and the air exhausting unit is disposed at the other end of the compartment.

8. The conveyor according to claim 1, wherein the air blowing means comprises:
   an air supplying unit that supplies air inside the compartment; and
   an air exhausting unit that exhausts the air supplied inside the compartment to an outside, wherein
   one of the air supplying unit and the air exhausting unit is disposed at the partition member and the other one of the air supplying unit and the air exhausting unit is disposed at both ends of the compartment extending along the cross direction of the conveyor.

9. The conveyor according to claim 7, wherein the air exhausting unit is connected to an exhausting duct included in the box making machine.

10. The conveyor according to claim 7, wherein at least one of the air supplying unit and the air exhausting unit is provided with an air gun.

11. The conveyor according to claim 1, wherein the partition member is formed of a curved plate having a curved unit and is fixed to supporting frames that are installed at the left and right of the conveyor belt and that support the plurality of guide rolls.

12. The conveyor according to claim 1, further comprising a device that vacuums paper dust adhering to the corrugated sheet being conveyed, the device being adjacent to an upstream side or a downstream side of an opposing roll along a conveying direction of the corrugated sheet, the opposing roll being opposed to the inlet roll.

13. A printing device having a conveyor and serving as a printing unit of a box making machine, the printing device comprising:
   the conveyor defined in claim 1; and
   a plurality of printing cylinders that print a letter and/or a picture on the corrugated sheet being conveyed on the conveying face of the conveyor belt.

14. A box making machine comprising: in sequence from an upstream side,
   a feeding unit;
   a printing unit that prints a letter and/or a picture on a corrugated sheet fed from the feeding unit while conveying the corrugated sheet;
   a slotter creaser unit that slots and creases the corrugated sheet subjected to printing in the printing unit; and
   a die cutting unit that punches a hole in the corrugated sheet subjected to the printing and ejected from the slotter creaser unit,
   wherein the printing unit is provided with a printing device defined in claim 13.

15. A box making machine comprising: in sequence from an upstream side,
   a feeding unit;
   a printing unit that prints a letter and/or a picture on a corrugated sheet fed from the feeding unit while conveying the corrugated sheet; and
   a die cutting unit that punches a hole in, slots, and creases the corrugated sheet subjected to printing in the printing unit,
   wherein the printing unit is provided with a printing device defined in claim 13.

* * * * *